United States Patent
Bober

(10) Patent No.: US 6,406,183 B1
(45) Date of Patent: Jun. 18, 2002

(54) COMPACT TOTE FOR PROTECTIVE STORAGE OF CONVERTIBLE TOP BOOT

(76) Inventor: Jason Bober, 9800 Middle Mill Dr., Owings Mills, MD (US) 21117

( * ) Notice: Subject to any disclaimer, the term of this patent is extended or adjusted under 35 U.S.C. 154(b) by 0 days.

(21) Appl. No.: 09/153,942

(22) Filed: Sep. 16, 1998

Related U.S. Application Data

(60) Provisional application No. 60/059,140, filed on Sep. 17, 1997.

(51) Int. Cl.[7] ............................................. B65D 33/06
(52) U.S. Cl. ......................... 383/25; 190/902; 383/99; 383/16; 383/105; 383/107; 383/109
(58) Field of Search ............................ 383/25, 99, 13, 383/15, 86, 105, 107, 109, 16, 110, 66; 190/115, 117, 902; 229/117.19, 117.09, 117.26

(56) References Cited

U.S. PATENT DOCUMENTS

| | | | | |
|---|---|---|---|---|
| 416,078 A | * | 11/1889 | Smith | 229/117.09 X |
| 783,811 A | * | 2/1905 | Allen | 383/25 |
| 1,217,357 A | * | 2/1917 | Sparrow | 383/39 |
| 1,658,997 A | * | 2/1928 | Mulford et al. | 190/902 X |
| 1,753,813 A | * | 4/1930 | Washburn | |
| 1,824,508 A | * | 9/1931 | Shipman | 383/25 X |
| 1,826,976 A | * | 10/1931 | Wright | 383/15 X |
| 2,343,260 A | | 3/1944 | Leader et al. | |
| 2,605,803 A | * | 8/1952 | Fletchner | 383/99 X |
| 2,745,524 A | * | 5/1956 | Plotkin | 383/16 X |
| 3,092,223 A | * | 6/1963 | Martin | 383/25 X |
| 3,286,910 A | * | 11/1966 | Offenburger | 229/117.19 X |
| 3,473,713 A | | 10/1969 | Campbell | |
| 3,557,853 A | * | 1/1971 | Jones | 383/86 |
| 3,945,415 A | * | 3/1976 | Febuary | 383/66 X |
| 3,952,847 A | * | 4/1976 | Via | 383/66 X |
| 3,974,959 A | * | 8/1976 | Ruda | 383/99 |
| 4,116,253 A | | 9/1978 | Watsley | |
| 4,578,814 A | * | 3/1986 | Skamser | 383/99 |
| 4,595,101 A | * | 6/1986 | Rivera | |
| 4,598,746 A | * | 7/1986 | Rabinowitz | 383/25 |
| 4,668,006 A | | 5/1987 | Wagner | |
| 4,679,242 A | * | 7/1987 | Brockhaus | 38/107 X |
| 4,783,113 A | | 11/1988 | Padlo | |
| 4,802,233 A | * | 1/1989 | Skamser | 383/99 X |

(List continued on next page.)

FOREIGN PATENT DOCUMENTS

| | | | | |
|---|---|---|---|---|
| FR | 1279773 | * | 4/1938 | 383/25 |
| GB | 483381 | * | 4/1938 | 383/107 |
| GB | 673437 | * | 6/1952 | 383/25 |

Primary Examiner—Lee Young
Assistant Examiner—Robin A. Hylton
(74) Attorney, Agent, or Firm—Law Offices of Royal W. Craig

(57) ABSTRACT

A collapsible boot storage tote bag for a convertible top boot cover. The boot storage bag is particularly configured to protectively store a flexible boot cover. Likewise, the boot storage bag is a compact easily managed package that is particularly configured to minimize the consumption of limited storage space. The boot storage bag has a tailored elongated rectangular shape that easily constrains the convertible boot cover when it is folded and placed inside. The elongated rectangular shape is closed at one end and closable at the other by a fold-over flap equipped with hook and loop fastening strips. The open end is further secured with two secondary dirt/dust guard flaps that fold under the main fold-over flap. A convenient carrying handle is centrally anchored on the top wall for balanced single handed means of transport. The carrying handle's placement on the top wall of such a flexible bag improves the grip of the sidewalls of the bag on the boot cover when carried, thus reducing the risk of having the boot cover shifting in the storage bag, becoming scuffed, compressed, or disfigured. This, the boot storage tote bag gives enhanced protection to the boot cover fabric from damage, staining or fading while the unused boot cover is carried, or stored in the vehicle during seasonal use, or when stored out of vehicle during cooler weather.

5 Claims, 12 Drawing Sheets

U.S. PATENT DOCUMENTS

| | | | | |
|---|---|---|---|---|
| 4,907,633 A | * | 3/1990 | Eckstein | 383/13 X |
| 4,946,289 A | | 8/1990 | Bolling et al. | |
| 4,955,981 A | | 9/1990 | Provost | |
| 4,966,279 A | * | 10/1990 | Pearcy | 190/117 X |
| 5,050,254 A | * | 9/1991 | Murphy | |
| 5,054,619 A | | 10/1991 | Muckenfuhs | |
| 5,158,367 A | * | 10/1992 | Derby | 383/107 X |
| 5,165,802 A | * | 11/1992 | Derby | 383/107 X |
| 5,201,565 A | | 4/1993 | Berardino | |
| 5,332,093 A | * | 7/1994 | Littlepage | 383/4 X |
| 5,354,131 A | | 10/1994 | Mogil | |
| 5,364,155 A | | 11/1994 | Kuwahara et al. | |
| 5,454,471 A | * | 10/1995 | Norvell | |
| 5,638,955 A | * | 6/1997 | Calciano | 383/86 X |
| 5,713,817 A | * | 2/1998 | Buchanan | |
| 5,800,061 A | * | 9/1998 | Volles | 383/99 X |
| 5,857,778 A | * | 1/1999 | Ells | |
| 5,871,280 A | * | 2/1999 | Watters | 383/66 X |
| 5,891,812 A | * | 4/1999 | Honeycutt et al. | |
| 5,892,202 A | * | 4/1999 | Baldwin et al. | |
| 6,000,604 A | * | 12/1999 | Lapoint, III | 383/99 X |
| 6,009,995 A | * | 1/2000 | Speck | 383/66 X |
| 6,021,740 A | * | 2/2000 | Martz | 190/117 X |
| 6,048,099 A | * | 4/2000 | Muffett et al. | |
| 6,074,093 A | * | 6/2000 | Anderson | 383/110 X |

* cited by examiner

COMPACT TOTE FOR PROTECTIVE STORAGE OF CONVERTIBLE TOP BOOT

CROSS-REFERENCE TO RELATED APPLICATIONS

The present application is based on U.S. provisional application Serial No. 60/059,140, filed Sep. 17, 1997.

BACKGROUND OF THE INVENTION

1. Field of the Invention

The present invention relates to storage bags and, more particularly, to a storage bag for storing the top boot cover of a convertible automobile.

2. Description of the Background

Convertible top boots are very expensive components of most convertible automobiles. Convertible boots are used to cover the folded convertible top stack when it is down. Many boot covers are constructed of a soft flexible vinyl or cloth fabric that is very susceptible to damage (i.e., cuts, tears, staining). In some cases these boots covers are expanding, and they have an internal spring mechanism and semi-rigid side panels.

Unfortunately, automotive manufacturers make no provision of how to store an unused boot when the top is up. The expanding boot covers can consume the entire rear passenger seating or most of the limited trunk space. Either way, the boot cover is susceptible to considerable damage from passengers or cargo, and the smallest cuts, tears or staining can mean expensive repairs or replacement.

It would be greatly advantageous to design a means to safely and securely store the boot cover, an expensive component when it is not installed.

Prior efforts to accomplish the foregoing are scarce. U.S. Pat. No. 4,668,006 to Wagner discloses a flexible automobile boot and a storage bag (50, FIG. 3) for the boot. After being removed from the vehicle, the boot is bent from its U shape to an enclosed shape. A flap of the bag is opened to insert the enclosed boot assembly for compact storage. However, the Wagner '006 device is described generally as a bag with a flap closure. No consideration is given to the design details, dimensions, pattern cut and assembly all of which are essential to ensure that the bag provides adequate protection.

It would be greatly advantageous to provide a boot cover storage bag that reliably holds and protects the boot by virtue of the following: (1) dimensions that are particularly configured to protectively encase a boot; (2) a pattern cut and assembly including top, end, and sidewall structure (not shown in Wagner '006) that provides a snug fit without unduly compressing and disfiguring the boot; (3) the combination of a particular handle on a flexible bag to improve the grip of the sidewalls of the bag on the boot when carried, thus reducing the risk of having the boot shift in the bag and become compressed or disfigured; and (4) a flexible material that specifically enhances both function and utility.

SUMMARY OF THE INVENTION

It is, therefore, an object of the present invention to provide a custom fitted convertible boot storage bag which is particularly configured to safely and securely store the boot cover when it is not installed.

It is another object to provide a convertible boot storage bag which stores the boot cover in a compact configuration which is custom fitted for convenient and unobtrusive storage in the trunk or passenger compartment by being particularly configured for the application.

It is another object to provide a convertible boot storage bag which protects the boot cover from damage, yet provides for quick and easy insertion and removal of the boot cover for storage.

It is another object to provide a convertible boot storage bag which provides for quick and easy storage and removal of the boot storage bag from the particular automative application.

According to the present invention, the above-described and other objects are accomplished by providing a convertible boot storage bag for a convertible top boot cover. The boot storage bag is designed to protectively store a flexible boot cover in a compact easily managed package that minimizes the consumption of limited storage space. The boot storage bag is preferably of a durable material (i.e. vinyl fabric, vinyl backed woven polyester fabric, leather, etc.) construction, and has a tailored elongated rectangular shape that is particularly configured to easily constrain the convertible boot when it is folded and placed inside. The particularly configured shape and the associated paneled structure of the boot storage bag provides a snug fit without unduly compressing and disfiguring the boot cover. The elongated rectangular shape is closed at one end and coverable at the other by a fold-over main flap, the flap being secured by hook and loop fastening strips. The open end is further secured with two secondary dirt/dust guard flaps that fold under the fold-over main flap. A convenient carrying handle is centrally anchored on the top wall for balanced single handed transport. This carrying handle's placement on the top of the wall of such a flexible bag further improves the firm grip of the sidewalls of the bag on the boot cover when carried, thus reducing the risk of having the boot cover shift in the bag and become scuffed, compressed, or disfigured. The boot cover is easily inserted into the boot storage bag by tightly folding the boot cover end over end, and by insertion of the boot cover lengthwise into the storage bag. The boot storage bag protects the boot cover fabric from damage, staining or fading while the unused boot cover is either stored in the vehicle during seasonal use, or when the boot cover is stored out of vehicle during cooler weather. The boot storage bag provides for quick and easy insertion and removal of the boot cover. When the boot cover is used, the boot storage bag's particularly configured paneled structure easily collapses and folds for storage in the vehicle.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

Figure 1:
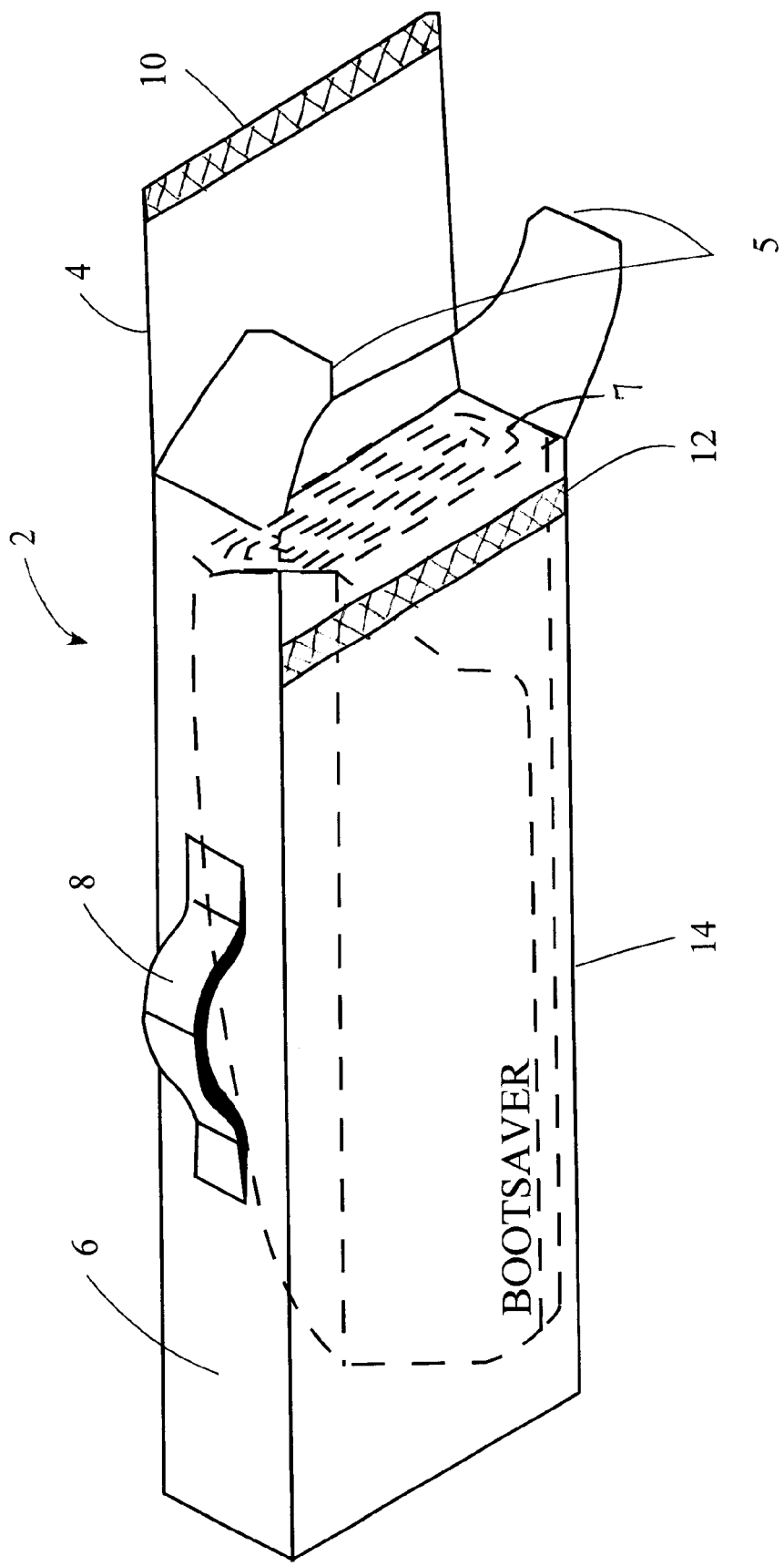
FIG. 1 is a side perspective drawing illustrating a boot storage bag 2 according to one embodiment of the present invention.

FIG. 1 is a side perspective drawing illustrating a boot cover storage bag 2 according to one embodiment of the present invention, with folded and stored boot 7 shown inside by dotted lines.

The boot storage bag 2 is a fitted storage pouch for a convertible top boot cover. It is designed to protectively store a flexible boot cover in a compact easily managed package that minimizes the consumption of limited storage space. The boot storage bag 2 protects the boot fabric from damage, staining or fading while the unused boot cover is either stored in the vehicle during seasonal use, or when the boot cover is stored out of vehicle during cooler weather. The boot storage bag 2 provides for quick and easy insertion and removal of the boot cover. When the boot cover is used, the boot storage bag's particularly configured structure easily collapses and folds for storage in the vehicle.

The boot storage bag 2 is preferably made from a durable material (i.e. vinyl fabric, vinyl backed woven polyester fabric, leather, etc.) construction. A black textured vinyl fabric or other durable materials (i.e. vinyl backed woven polyester fabric, leather, etc.) available in a variety of colors have been found to be rugged and yet stylish. The selection of these specific type of materials further contributes to the utility of the boot storage bag 2 by permitting the bag to be both flexible to secure the contents when in use, as well as, permit the convenient compact storage of the empty storage bag.

The boot storage bag 2 has a tailored elongated rectangular shape that is particularly configured to easily constrain the convertible boot when it is folded and placed inside. The elongated rectangular shape is defined by a front wall 14 and identical rear wall (not seen), a top wall 6 and identical bottom (not seen), and a fold-over main flap cover 4 equipped with a hook 10 and loop 12 fastening system. This particularly configured shape and the associated paneled structure of the boot storage bag provides a snug fit without unduly compressing and disfiguring the boot cover 7. The open end is further secured with two secondary dirt/dust guard flaps 5 that fold under the main fold-over flap 10. A convenient carrying handle 8 is centrally anchored on the top wall 6 for balanced single handed transport. This carrying handle's placement on the top wall of such a flexible bag further improves the firm grip of the sidewalls of the bag on the boot cover when carried, thus reducing the risk of having the boot cover shift in the bag, becoming scuffed, compressed, or disfigured.

Figure 2:
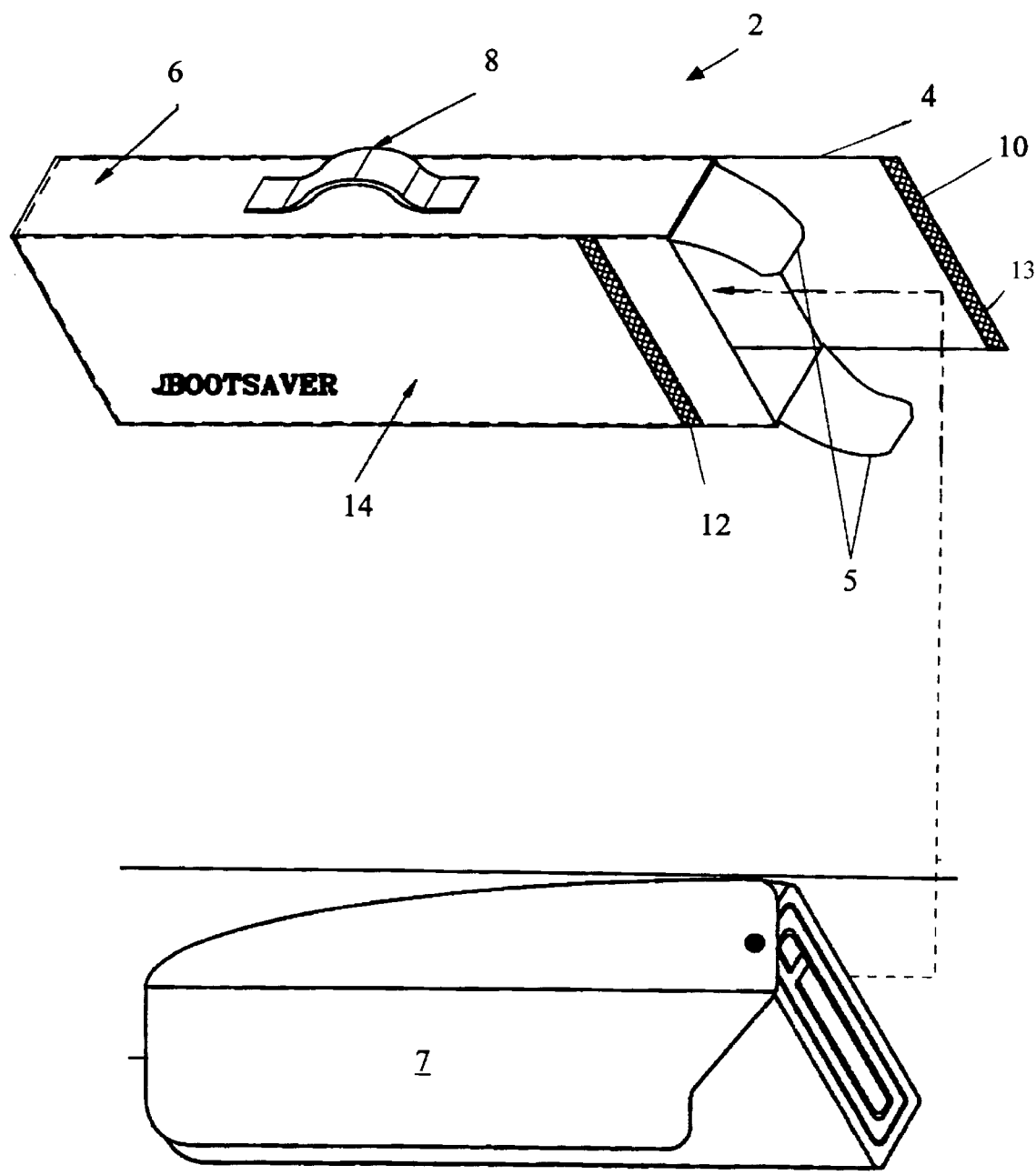
FIG. 2 is a side perspective drawing as in FIG. 1 with convertible boot cover 7 removed as shown by the dotted lead line.

FIG. 2 is a side perspective drawing as in FIG. 1 with convertible boot cover 7 removed as shown by the dotted lead line. The boot cover 7 is easily inserted into the boot storage bag 2 by tightly folding the boot cover 7 end over end, and by insertion of the boot cover 7 lengthwise into the storage bag 2. Removal of the folded boot cover is equally easy, and the boot storage bag 2 has a particular sewn-panel structure (to be described) that allows it to be easily collapsed, rolled or folded for convenient storage when the boot cover 7 is installed on the vehicle.

Figure 3:
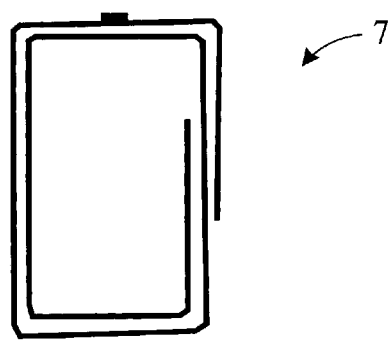
FIG. 3 is a side view of the folded boot cover 7.

FIG. 3 is a side view of the folded boot cover 7.

Figure 4:
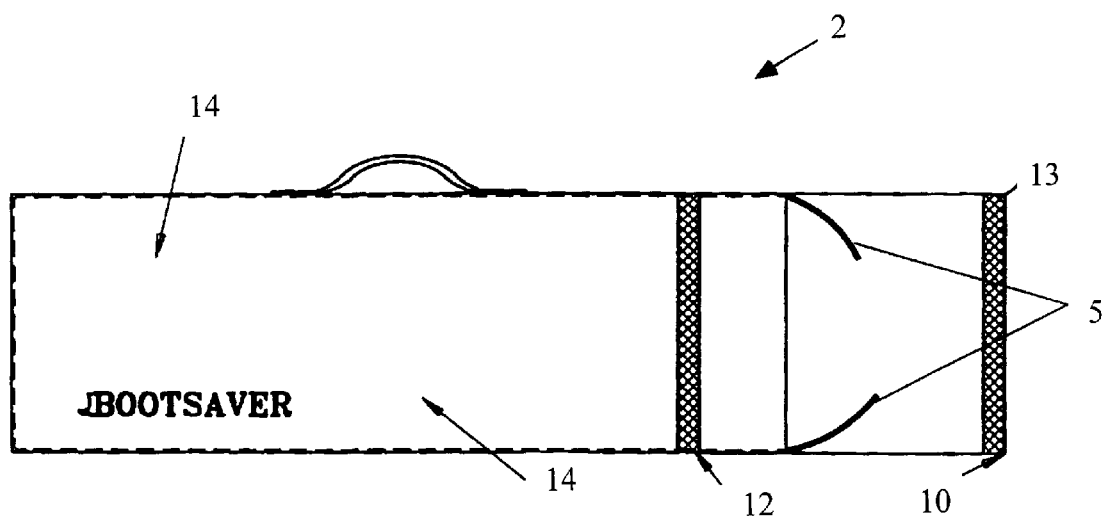
FIG. 4 is a front view of the boot storage bag 2 of FIG. 1.

FIG. 4 is a front view of the boot storage bag 2 of FIG. 1 illustrating the rectangular shape and relative placement of the hook and loop fastening system on main flap 10 (including hook strip 12 and loop strip 13), and the two secondary dirt/dust guard flaps 5.

Figure 5:
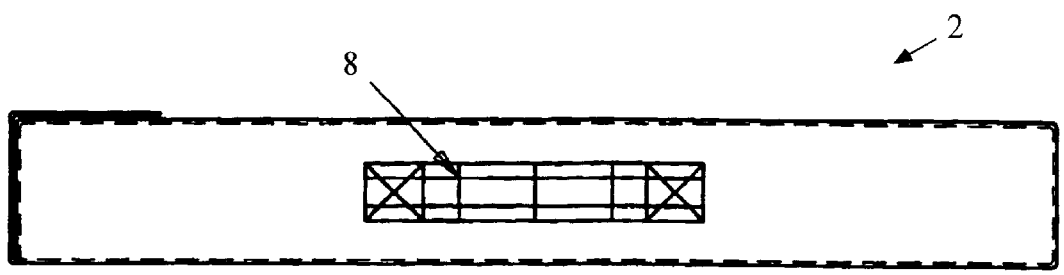
FIG. 5 is a top view of the boot storage bag 2 of FIG. 1.

FIG. 5 is a top view of the boot storage bag 2 of FIG. 1. The carrying handle 8 is constructed of grained black vinyl fabric or other durable material (i.e. vinyl backed woven polyester fabric, leather, etc.) that is reinforced in both the grip area and at the bag attachment points. The carrying handle provides a convenient means by which to transport the boot storage bag 2. The convenient carrying handle is centrally anchored on the top of the wall for balanced single handed means of transport. This carrying handle's central placement on the top wall 6 of the flexible bag compresses the side walls 14 against the boot cover 7 when lifted, thereby improving the grip of the sidewalls 14 on the boot cover while being carried. This reduces the risk of having the boot cover 7 shift in the bag, becoming scuffed, compressed, or disfigured.

An exemplary pattern of construction for storage bag 2 will now be described with focus on appropriate dimensions. The illustrated dimensions are particularly suited for a Volkswagon Cabrio® boot cover, and it should be noted that dimensions may be easily adapted for other boot covers and may be particularly configured for a custom fit for specific storage requirements. The Volkswagon Cabrio® storage bag 2 is formed by sewing together the panels shown in FIGS. 7–12, the dimensions of the individual panels being shown thereon.

Figure 6:
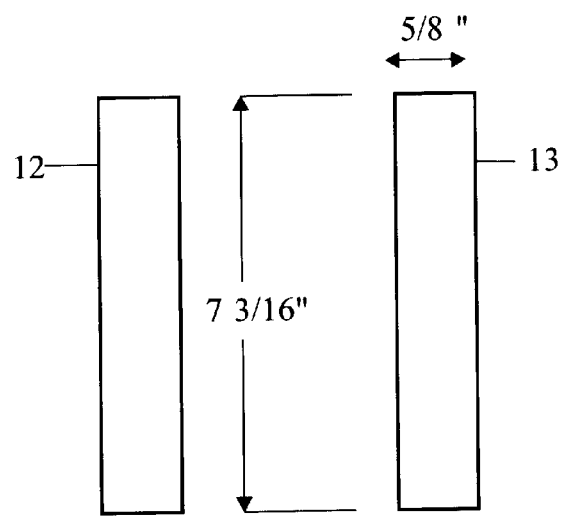
FIG. 6 is a side view of the hook and loop fastening strips 12, 13 which are used for securing the main flap 10.

FIG. 6 is a side view of the hook and loop fastening strips 12, 13 which are used for securing the main flap 10.

Figure 7:
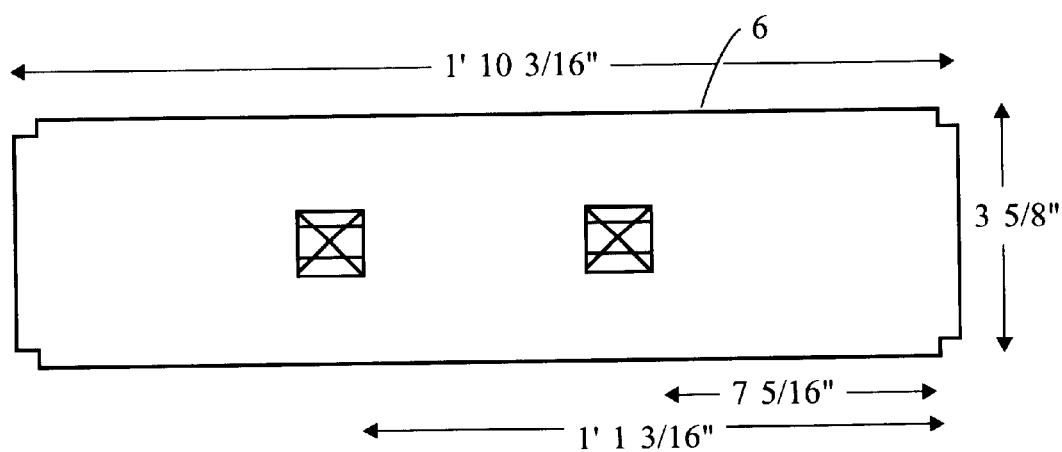
FIG. 7 is a top view of the top wall panel 6.

FIG. 7 is a top view of the top wall panel 6.

Figure 8:
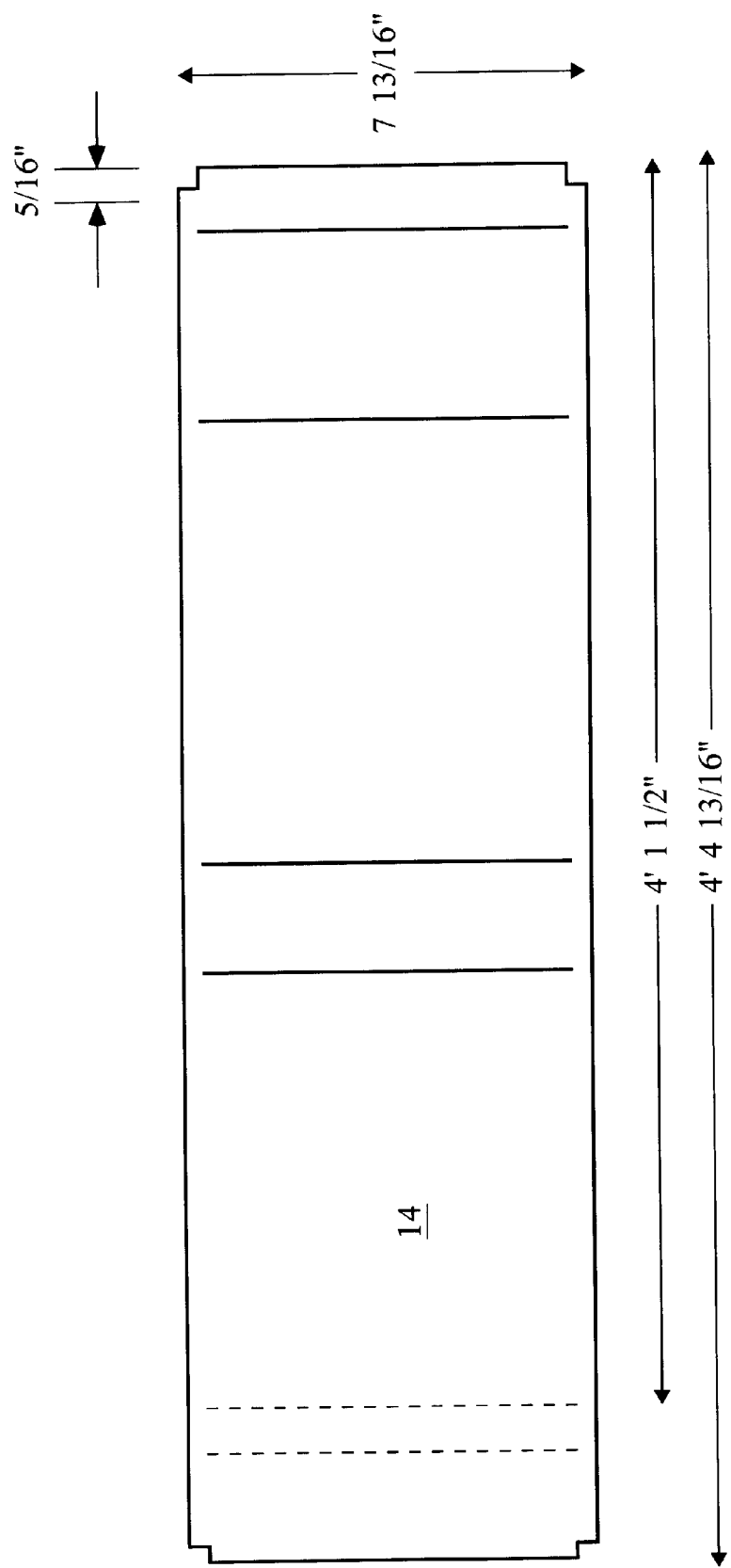
FIG. 8 is a front view of the front wall 14 panel that is elongated and wraps around to form the identical rear wall of the boot storage bag 2, bag 2 measuring a compact 36 inches in length and 12 inches in width.

FIG. 8 is a front view of the front wall 14 panel that is elongated and wraps around to form the identical rear wall of the boot storage bag 2, bag 2 measuring a compact 36 inches in length and 12 inches in width.

Figure 9:
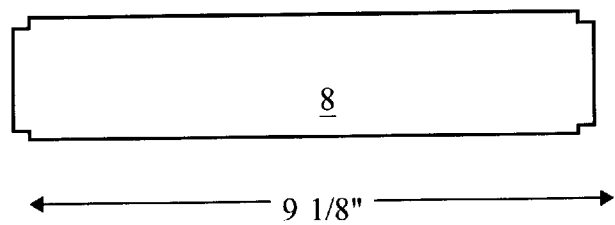
FIG. 9 is a top view of the handle 8.

FIG. 9 is a top view of the handle 8.

Figure 10:
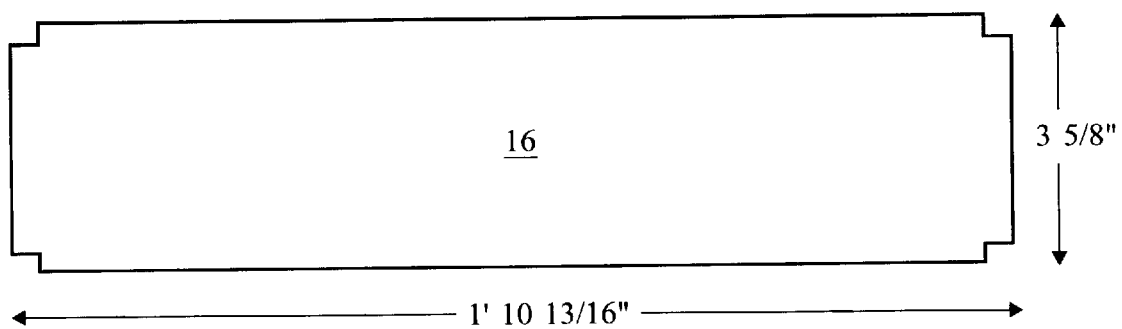
FIG. 10 is a top view of the bottom panel (identical to the top panel 6).

FIG. 10 is a top view of the bottom panel (identical to the top panel 6).

Figure 11:
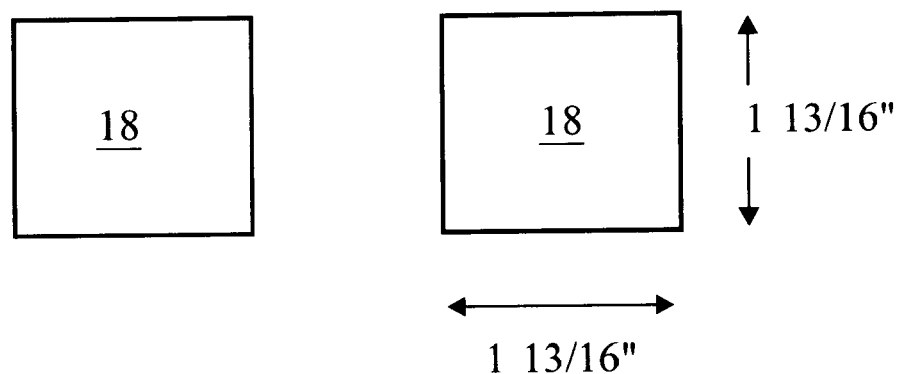
FIG. 11 is a top view of the handle reinforcements used to secure the handle of FIG. 9 to the top panel 6.

FIG. 11 is a top view of the handle reinforcements used to secure the handle of FIG. 9 to the top panel 6.

Figure 12:
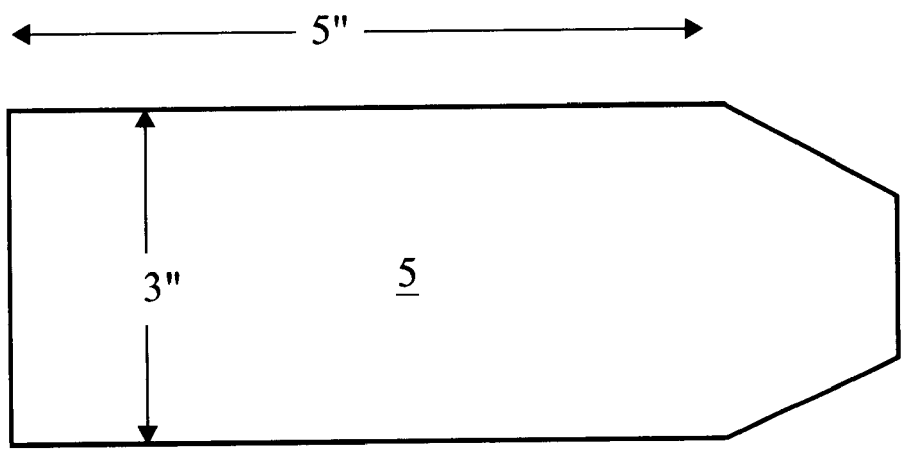
FIG. 12 shows one of the two identical secondary dirt/dust flaps 10.

FIG. 12 shows one of the two identical secondary dirt/dust flaps 10.

The above-described panels of FIGS. 6–12 are assembled by sewing, and the resulting convertible boot cover storage bag 2 stores the boot cover in a compact configuration that is particularly configured for convenient and unobtrusive placement in the trunk or passenger compartment. The vinyl fabric or other durable material (i.e vinyl backed woven polyester fabric, leather, etc.) protects the boot cover from damage, yet provides for quick and easy insertion and removal of the boot cover for storage. The selection of these specific type of materials further contributes to the utility of the boot storage bag 2 by permitting the bag to be both flexible to secure the contents when in use, as well as, permit the convenient compact storage of the empty storage bag.

Figure 13:
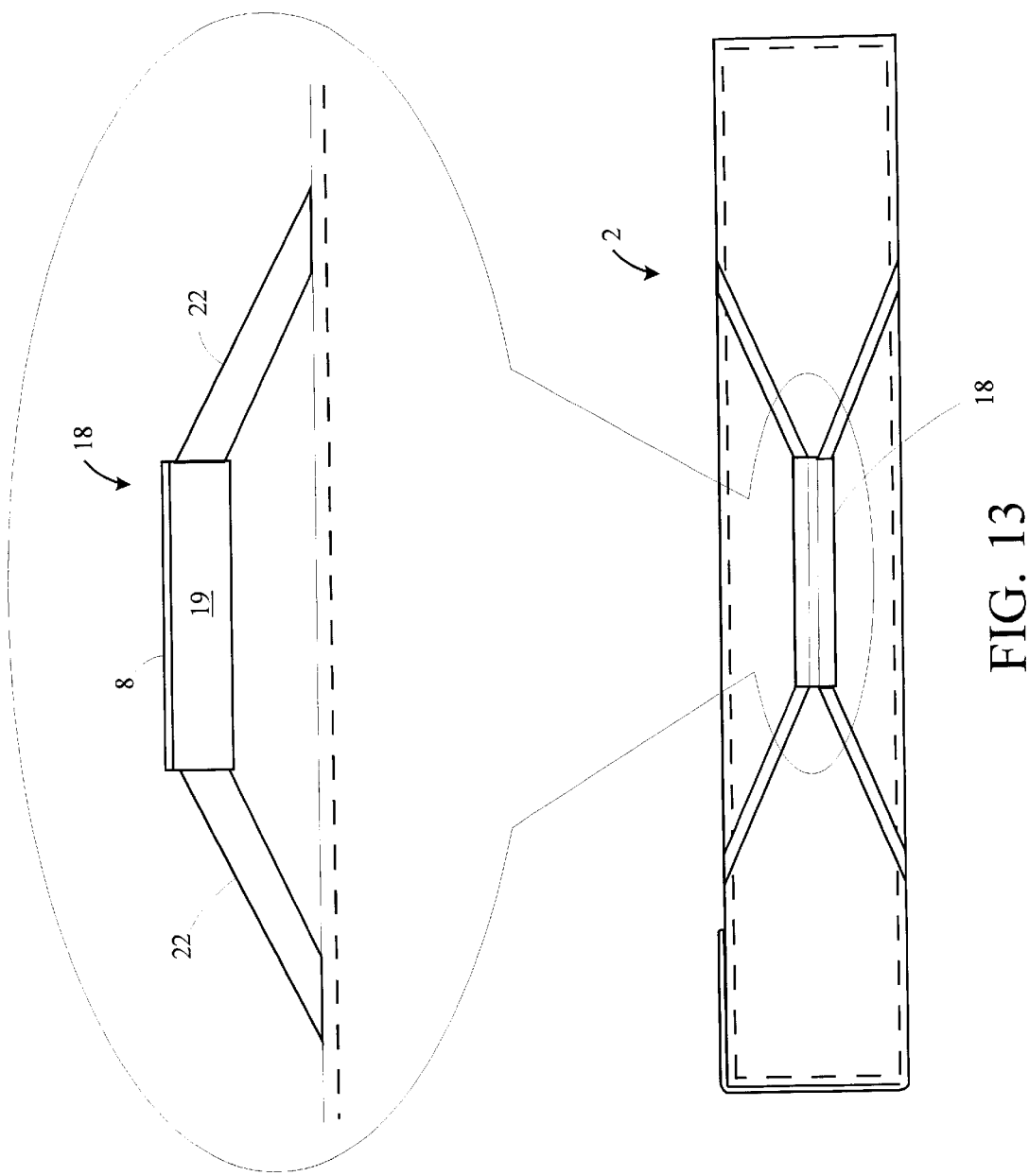
FIG. 13 is a top perspective drawing of boot storage bag 2 with an enlarged bubble illustration of an alternate handle 18 design.

FIG. 13 is a top perspective drawing of boot storage bag 2 with an enlarged bubble illustration of an alternate handle 18 design. Handle 18 is formed from two handle straps 22 which may be lengths of the same vinyl fabric or other durable material (i.e vinyl backed woven polyester fabric, leather, etc.). The ends of the handle straps 22 are sewn into the hem of the front and rear walls 14 and top wall 6 of the boot storage bag 2. More specifically, the ends of one handle strap 22 are sewn into the hem of the front wall 14 and top wall 6. The ends of the other handle strap 22 are sewn into the hem of the rear wall 14 and top wall 6. This provides opposing handle straps which are then joined together by a handle overwrap 19. Handle overwrap 19 may be an additional section of vinyl fabric or other durable material (i.e vinyl backed woven polyester fabric, leather, etc.) sewn upon itself to form a sleeve.

FIGS. 14–19 are pattern drawings that collectively comprise a second pattern of components for producing the boot storage bag 2 of FIG. 1, and including alternate handle 18 design. Approximate dimensions are shown thereon.

Figure 14:
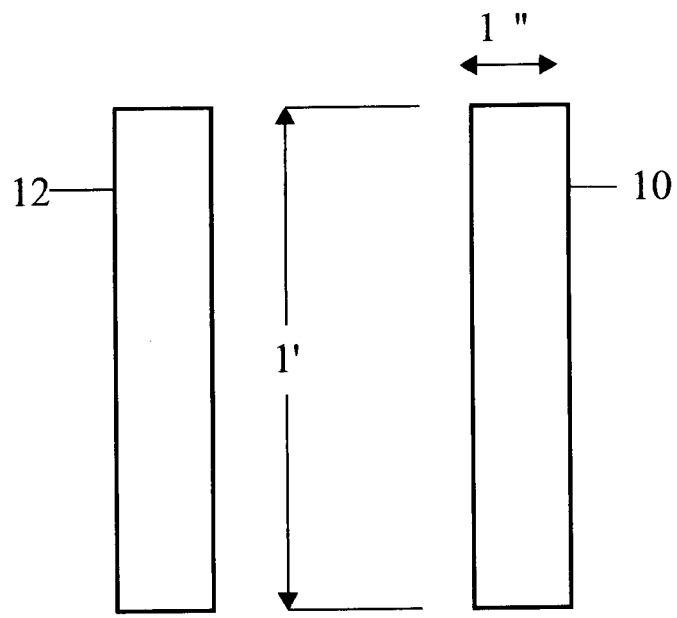
FIGS. 14–19 are pattern drawings that collectively comprise a second pattern of components for producing the boot storage bag 2 of FIG. 1.

FIG. 14 is a side view of the hook and loop fastening strips 12, 13 which are used for securing the main flap 10.

Figure 15:
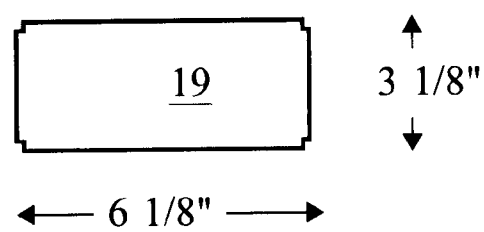
Figure 16:
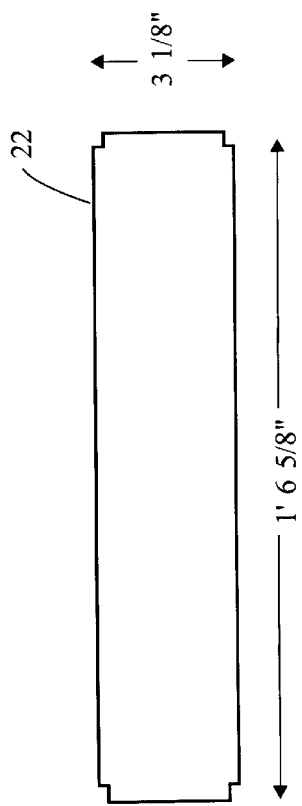

FIGS. 15 and 16 illustrate the handle overwrap and handle straps, two of which are needed for the handle configuration of FIG. 13. The two opposing handle straps 18 are formed from two identical pattern cuts of material, and handle overwrap 19 is formed from an additional pattern cut of vinyl fabric or other durable material (i.e vinyl backed woven polyester fabric, leather, etc.) which is then sewn or otherwise rolled and fastened upon itself to form a sleeve.

Figure 17:
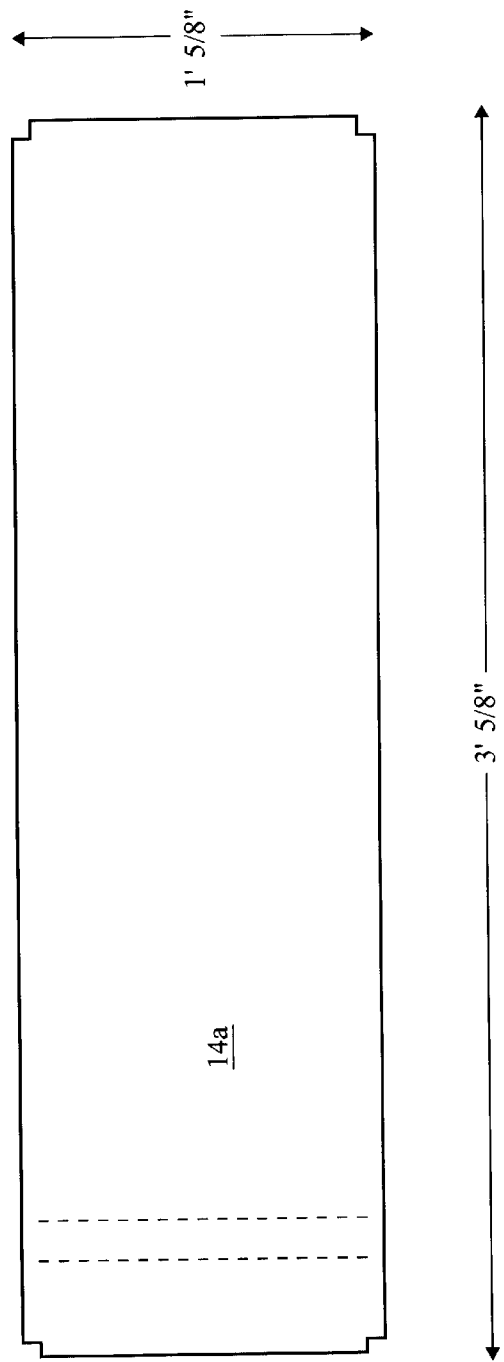
Figure 18:
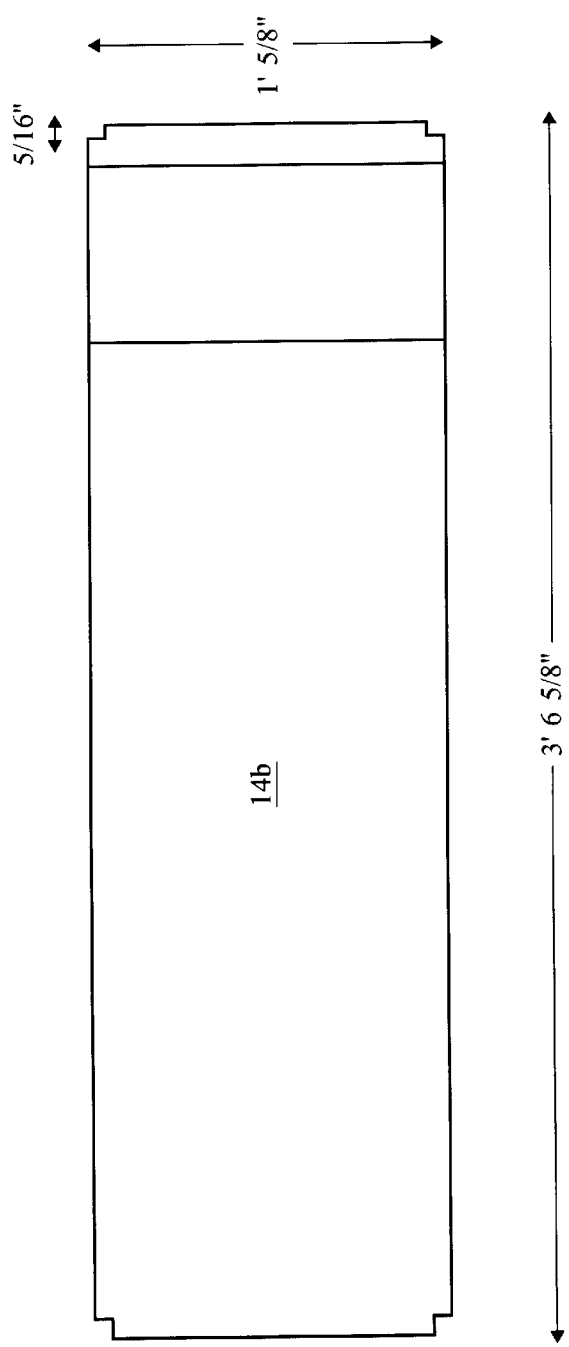

FIGS. 17 and 18 illustrate the front panel 14a and back panel 14b, respectively. The primary difference (in contrast to the pattern of FIGS. 7–13) lies in the cut of the front and rear walls 14. Rather than a single wrap-around pattern section forming both front and rear walls 14, the front and rear walls 14 are formed from two identical pattern sections.

Figure 19:
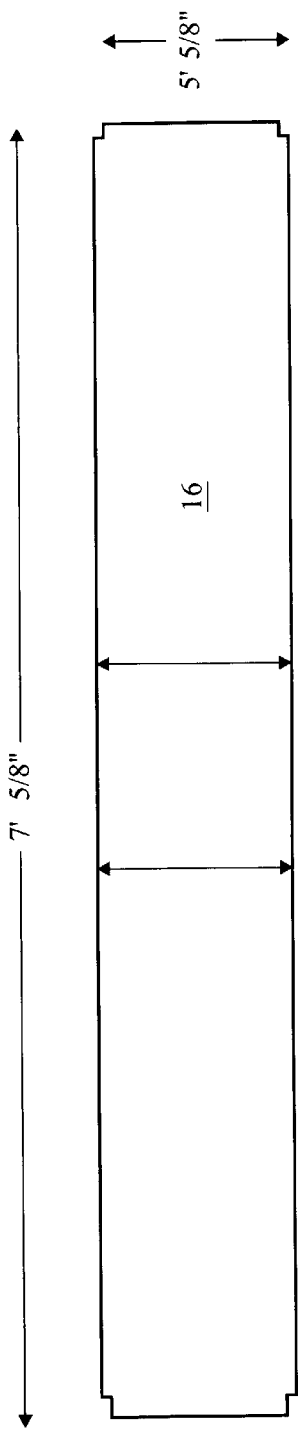

FIG. 19 illustrates the pattern cut for the top and bottom walls 6, 16. Rather than two identical pattern sections forming both top and bottom walls 6, 16, both are formed from a single wrap-around pattern section.

Figure 20:
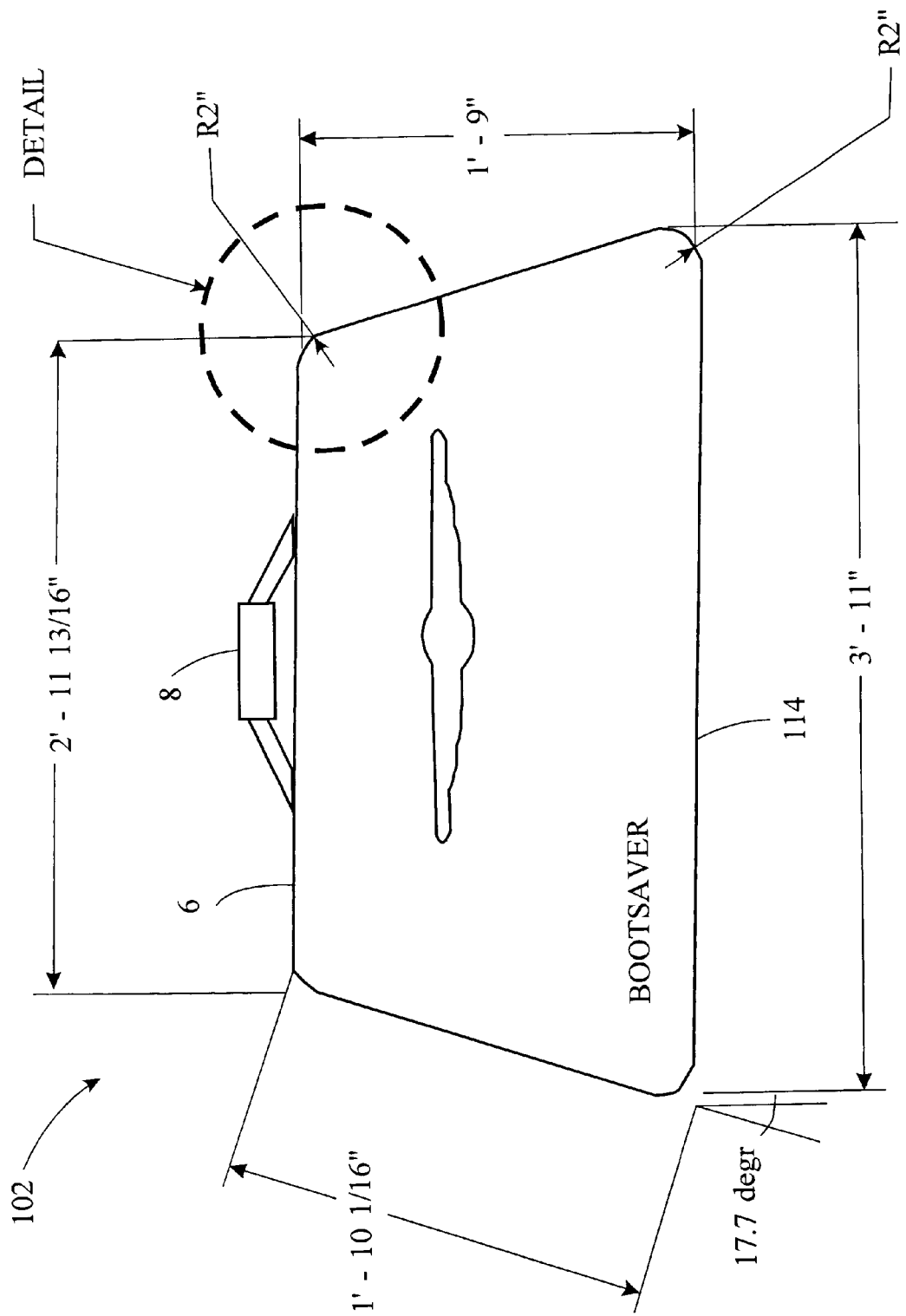
FIG. 20 is a front perspective view of alternative dimensions for the storage bag 2 that are better suited for storage of a Chrysler Sebring® convertible top boot cover.

FIG. 20 is a front perspective view of alternative dimensions for a storage bag 102 that are better suited for storage of a Chrysler Sebring® convertible top boot cover. This configuration is in all respects identical except that the dimensions of front wall 114 and identical rear wall (not seen) are altered as shown to give angled sides for a proper fit.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. A sorage device for a convertible top boot cover, comprising:

an elongate flexible bag for enclosing and constraining a convertible boot when folded in an elongate rectangular configuration and placed inside, said flexible bag having an elongated rectangular shape tailored to the dimensions of said folded convertible boot, and having distally opposed closed end and open end, and further including, a fold-over main flap attached at the open end of said bag for selectably closing said bag, a set of hook and loop fastening strips one each attached to said flexible bag and to said fold-over main flap for securing the fold-over main flap to said bag, a pair of secondary guard flaps attached at the open end of said bag that fold under the fold-over main flap, a carrying handle centrally anchored on said bag for balanced single handed transport, a unitary pattern section forming wrap-around front and rear walls and end panel sections which define said closed end and said fold-over main flap, plus a pair of discrete top and bottom walls, said unitary pattern section and pair of discrete top and bottom walls being formed from a vinyl backed woven polyester fabric, whereby said boot storage bag protects said boot cover from damage, staining or fading while the unused boot cover is stored in a vehicle during seasonal use, and when said boot cover is stored out of the vehicle during cooler weather.

2. A storage device for a convertible top boot cover, comprising:

an elongate flexible bag for enclosing and constraining a convertible boot when folded and placed inside, said flexible bag having an elongated rectangular shape tailored to the dimensions of said folded convertible boot, with and having distally opposed closed end and open end, and further including, a fold-over main flap attached at the open end of said bag for selectably closing said bag, a set of hook and loop fastening strips one each attached to said flexible bag and to said fold-over main flap for securing the fold-over main flap to said bag, a pair of secondary guard flaps attached at the open end of said bag that fold under the fold-over main flap, a carrying handle centrally anchored on said bag for balanced single handed transport, discrete front and rear panel sections, plus a unitary pattern section forming wrap-around top, bottom, and end panel sections, whereby said boot storage bag protects said boot cover from damage, staining or fading while the unused boot cover is stored in a vehicle during seasonal use, and when said boot cover is stored out of the vehicle during cooler weather.

3. The storage device for a convertible top boot cover according to claim 2, wherein said carrying handle is centrally located on the top wall, thereby serving to compress said bag inwardly when carried to improve the grip of the sidewalls on the boot cover and reducing the risk of damage thereto.

4. The storage device for a convertible top boot cover according to claim 3, wherein said boot storage bag's configured paneled structure easily collapses and folds for storage in vehicles.

5. The storage device for a convertible boot top cover according to claim 1, wherein said carrying handle is centrally located on the top wall, thereby serving to compress said bag inwardly when carried to improve the grip of the sidewalls on the boot cover and reducing the risk of damage thereto.

* * * * *